(12) United States Patent
Taguchi

(10) Patent No.: US 7,245,681 B1
(45) Date of Patent: Jul. 17, 2007

(54) RECEIVING TERMINAL, RECEIVER AND RECEIVING METHOD FOR CDMA SYSTEM

(75) Inventor: Motoyasu Taguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 699 days.

(21) Appl. No.: 09/656,170

(22) Filed: Sep. 6, 2000

(30) Foreign Application Priority Data

Sep. 6, 1999 (JP) ............................. 11/251229

(51) Int. Cl.
H04L 7/00 (2006.01)
(52) U.S. Cl. .................. 375/354; 375/136; 375/150; 375/145; 375/355; 375/364
(58) Field of Classification Search ............. 375/130, 375/136, 140, 147, 148, 150, 145, 354, 355, 375/364; 370/320, 335, 441, 342; 455/132, 455/127.5
See application file for complete search history.

(56) References Cited

U.S. PATENT DOCUMENTS

| | | | | |
|---|---|---|---|---|
| 5,239,684 A | * | 8/1993 | Ishikura | 455/67.7 |
| 5,487,083 A | * | 1/1996 | Nakajima et al. | 375/142 |
| 5,566,364 A | * | 10/1996 | Mizoguchi et al. | 455/132 |
| 5,970,084 A | * | 10/1999 | Honda | 375/147 |
| 5,974,038 A | | 10/1999 | Shou et al. | |
| 6,188,682 B1 | * | 2/2001 | Takagi et al. | 370/342 |
| 6,363,101 B1 | * | 3/2002 | Sudo et al. | 375/147 |
| 6,590,886 B1 | * | 7/2003 | Easton et al. | 370/342 |
| 6,600,907 B1 | * | 7/2003 | Taguchi | 455/132 |
| 6,625,202 B1 | * | 9/2003 | Sudo et al. | 375/147 |
| 6,628,698 B1 | * | 9/2003 | Oda | 375/147 |

FOREIGN PATENT DOCUMENTS

| | | |
|---|---|---|
| GB | 2345416 | 7/2000 |
| JP | 7-231278 | 8/1995 |
| JP | 7-273689 | 10/1995 |
| JP | 9-321667 | 12/1997 |
| JP | 10-4383 | 1/1998 |
| JP | 11-261523 | 9/1999 |

* cited by examiner

*Primary Examiner*—Dac Ha
*Assistant Examiner*—T Wang
(74) *Attorney, Agent, or Firm*—Foley & Lardner LLP (57) ABSTRACT

A receiving terminal for CDMA system for receiving received signals from a plurality of signal propagation channels is disclosed. The electric field level of the received signal from each signal propagation channel is judged, and the operation control clock supply to a circuit system receiving signal from a low electric field level signal propagation channel is suspended for a predetermined period of time for power consumption reduction.

26 Claims, 9 Drawing Sheets

RECEIVING TERMINAL, RECEIVER AND RECEIVING METHOD FOR CDMA SYSTEM

BACKGROUND OF THE INVENTION

The present invention relates to receiving terminals, receivers and receiving methods for CDMA (Code Division Multiple access) system and, more particularly, receiving terminals for CDMA system capable of reducing power consumption.

Figure 8:
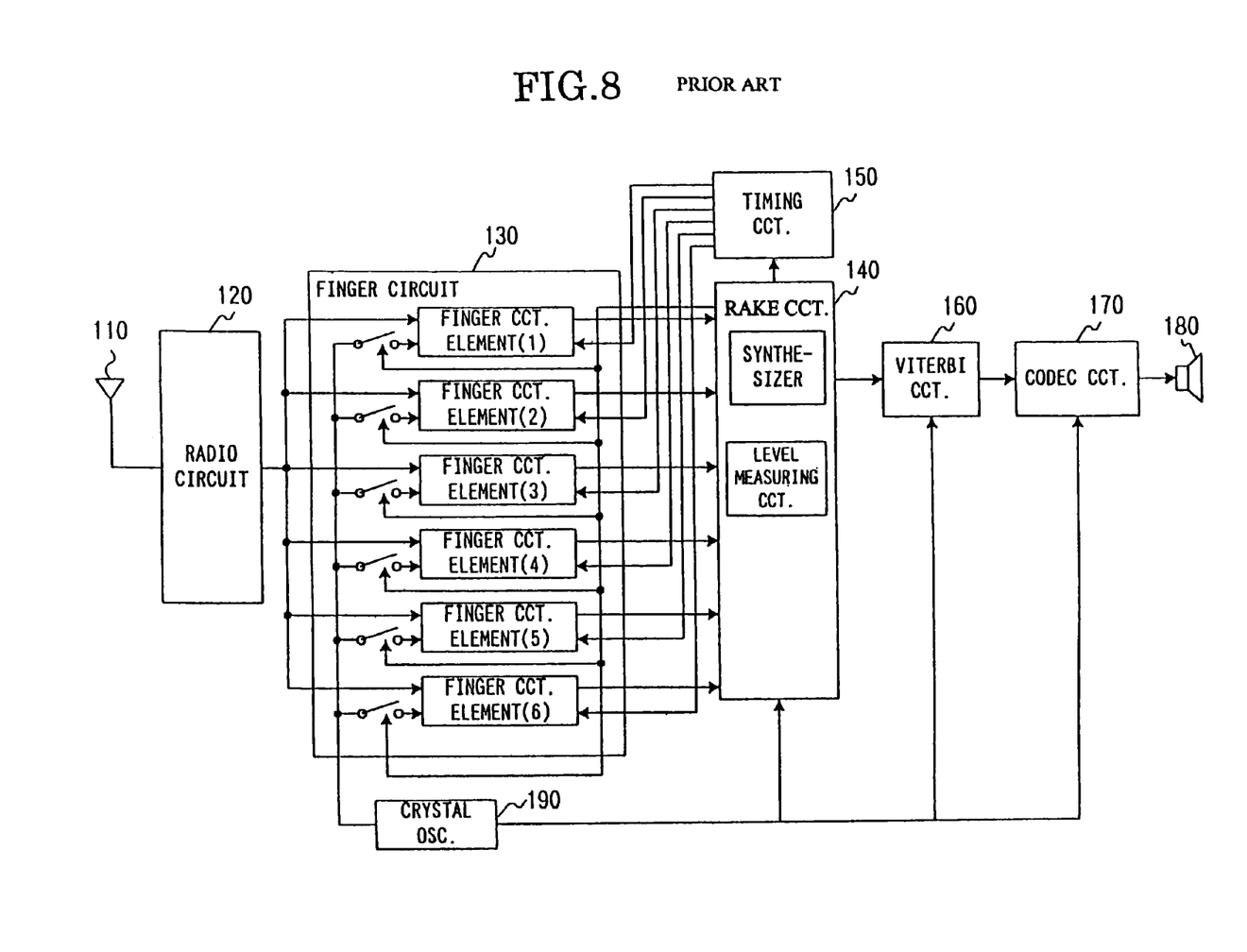
FIG. 8 is a block diagram showing a prior art receiving terminal for CDNA system.

FIG. 8 is a block diagram showing a prior art receiving terminal for CDMA system. The receiving terminal for CDMA system comprises an antenna 110, a radio circuit 120, a finger circuit 130 including a plurality of (i.e., six in the illustrated example) finger circuit elements, a rake circuit 140 including a synthesizer and a level measuring circuit, a timing circuit 150, a Viterbi circuit 160, a codec circuit 170, a loudspeaker 180 and a crystal oscillator 190.

The finger circuit 130 includes six finger circuit elements (1) to (6), which each obtain a correlation between a received signal fed out from the radio circuit 120 and a known signal and feed out the resultant correlated value of the received signal to the rake circuit 140. The timing circuit 150 determines the timings for obtaining the correlated values in the finger circuit 130. The individual finger circuit elements (1) to (6) obtain the correlated values under control of a pulse signal fed out for every 10 msec. from the timing circuit 150 as triggers. The rake circuit 140 executes synthesis of the correlated values of the received signal and level measurement. The Viterbi circuit 160 executes error correction of the synthesized received signal from the rake circuit 140. The codec circuit 170 converts the corrected received signal from the rake circuit 140 to a voice signal, which is fed out to the loudspeaker 180 for outputting voice. The crystal oscillator 190 generates clocks for controlling the operation of various components.

In the prior art described above, however, the finger circuit 130 and timing circuit 150 operate independently of the level of the received signal. This leads to a problem that the power consumption is increased or is too high.

SUMMARY OF THE INVENTION

An object of the present invention is to provide a receiving terminal, a receiver and receiving method for CDMA system capable of reducing power consumption.

According to an aspect of the present invention, there is provided a receiving terminal for CDMA system comprising at least a finger circuit for taking a correlation of a received signal from a radio circuit connected to an antenna and known signal and feeding out the correlated received signal, and a rake circuit for combining a plurality of outputs from the finger circuits and executing level measurement, wherein: the rake circuit includes a level judgment circuit for executing electric field judgment according to the correlated received signal from the finger circuit and a predetermined threshold level, the operation of a predetermined circuit being suspended according to the result of the level judgment.

The operation control clock supply to the finger circuit is suspended for power consumption reduction according to the result of the level judgment in the level judging circuit. The operation control clock supply to a timing circuit in the finger circuit is suspended according to the result of level judgment in the level judging circuit. The operation control clock supply is suspended after the lapse of a predetermined period of time. The operation control clock supply to the finger circuit or to the timing circuit therein is resumed after the lapse of predetermined period of time.

The threshold value is preset in a memory. The memory is an $E^2PROM$, and threshold data therefrom is supplied under CPU control to the rake circuit. The finger circuit takes correlation of output signal data fed out from the radio circuit and known signal data to each other, demodulates the correlated data to symbol unit data, and feeds out the demodulated data to the rake circuit. The level measurement is executed by computing the power level in a pilot symbol part in one frame for each slot and adding together the results of the computation for one frame. The finger circuit includes a plurality of finger circuit elements, which each obtains the difference of the maximum level and a pertinent level among the electric field levels in them and compare the difference and the threshold value with each other.

According to another aspect of the present invention, there is provided a receiving terminal for CDMA system for receiving received signals from a plurality of signal propagation channels, wherein: the electric field level of the received signal from each signal propagation channel is judged, and the operation control clock supply to a circuit system receiving signal from a low electric field level signal propagation channel is suspended for a predetermined period of time for power consumption reduction.

According to other aspect of the present invention, there is provided a receiver for CDMA system comprising at least a finger circuit for taking a correlation of a received signal from a radio circuit connected to an antenna and known signal and feeding out the correlated received signal, and a rake circuit for combining a plurality of outputs from the finger circuits and executing level measurement, wherein: the rake circuit includes a level judgment circuit for executing electric field judgment according to the correlated received signal from the finger circuit and a predetermined threshold level, the operation of a predetermined circuit being suspended according to the result of the level judgment.

Various modifications may be employed in accordance with the above ways.

According to still other aspect of the present invention, there is provided a receiver for CDMA system for receiving received signals from a plurality of signal propagation channels, wherein:

the electric field level of the received signal from each signal propagation channel is judged, and the operation control clock supply to a circuit system receiving signal from a low electric field level signal propagation channel is suspended for a predetermined period of time.

According to further aspect of the present invention, there is provided a receiving method for CDMA system with step for taking a correlation of a received signal and known signal and combining a plurality of correlated signals for level measurement, the method further comprising:

executing electric field judgment according to the correlated received signal and a predetermined threshold level, and suspending an operation of a predetermined circuit according to the result of the level judgment.

According to still further aspect of the present invention, there is provided a receiving method for CDMA system for receiving received signals from a plurality of signal propagation channels including steps of:

judging the electric field level of the received signal from each signal propagation channel; and suspending the operation control clock supply to a circuit receiving signal from a low electric field level signal propagation channel for a predetermined period of time.

Other objects and features will be clarified from the following description with reference to attached drawings.

PREFERRED EMBODIMENTS OF THE INVENTION

Preferred embodiments of the present invention will now be described with reference to the drawings.

In the receiving terminal for CDMA system according to the present invention, when receiving signals from a plurality of signal propagation channels, the rake circuit, particularly a level judging circuit therein, judges the electric field level of the received signal from each signal propagation channel. Using the results of the level judgment, the supply of the operation clock to the circuit, which receives the signal from the propagation channel with lower electric level, is stopped at a constant time, thus reducing the power consumption.

Figure 1:
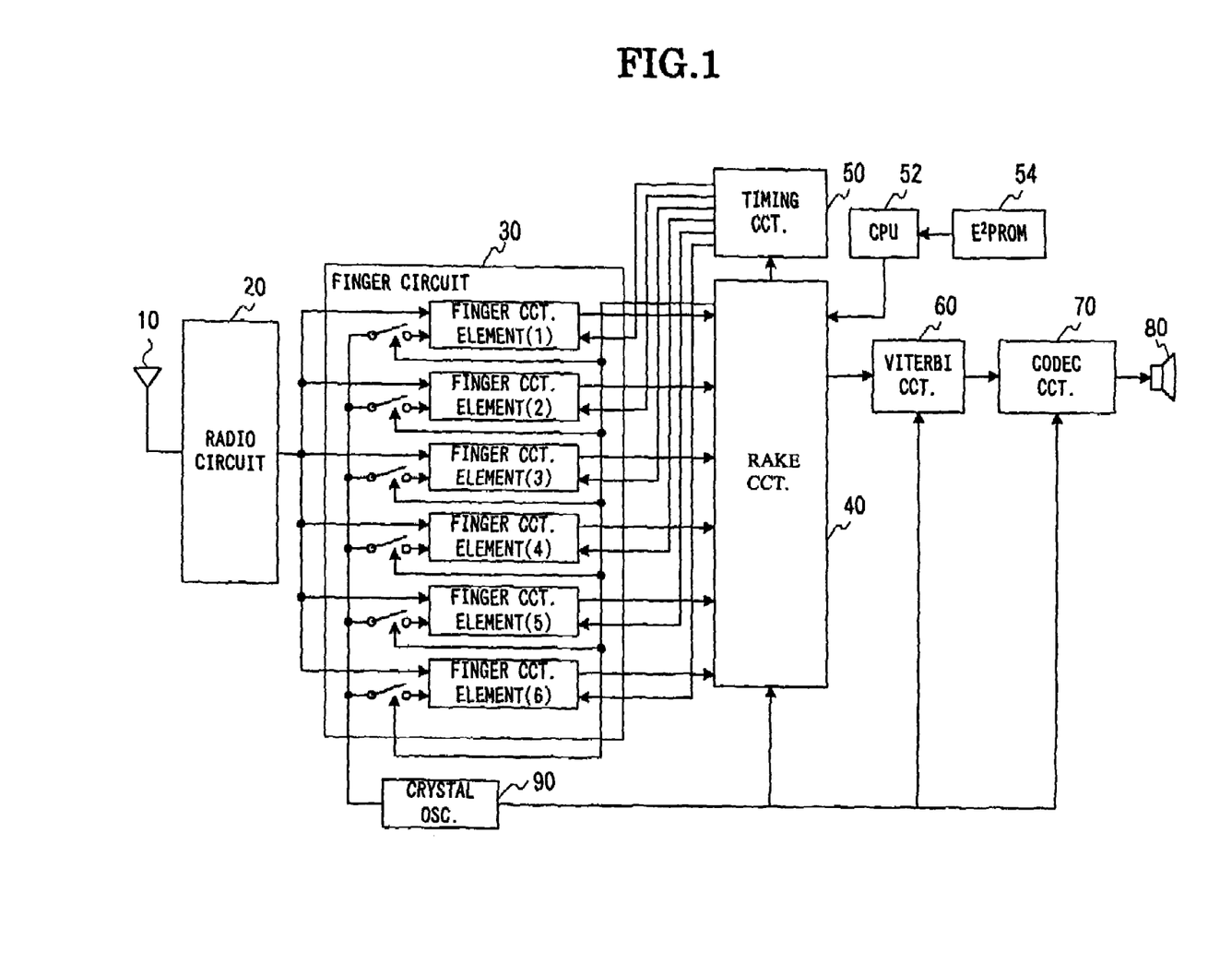
FIG. 1 is a block diagram showing a preferred embodiment of the receiving terminal for CDMA system according to the present invention.

As shown in FIG. 1, the receiving terminal for CDMA system comprises a CPU 52 and a memory (E$^2$PROM) 54 in addition to an antenna 10, a radio circuit 20, a finger circuit 30 having a plurality of finger circuit elements (1) to (6), a rake circuit 40, a timing circuit 50, a Viterbi circuit 60, a codec circuit 70, a loudspeaker 80 and a crystal oscillator 90.

Figure 2:
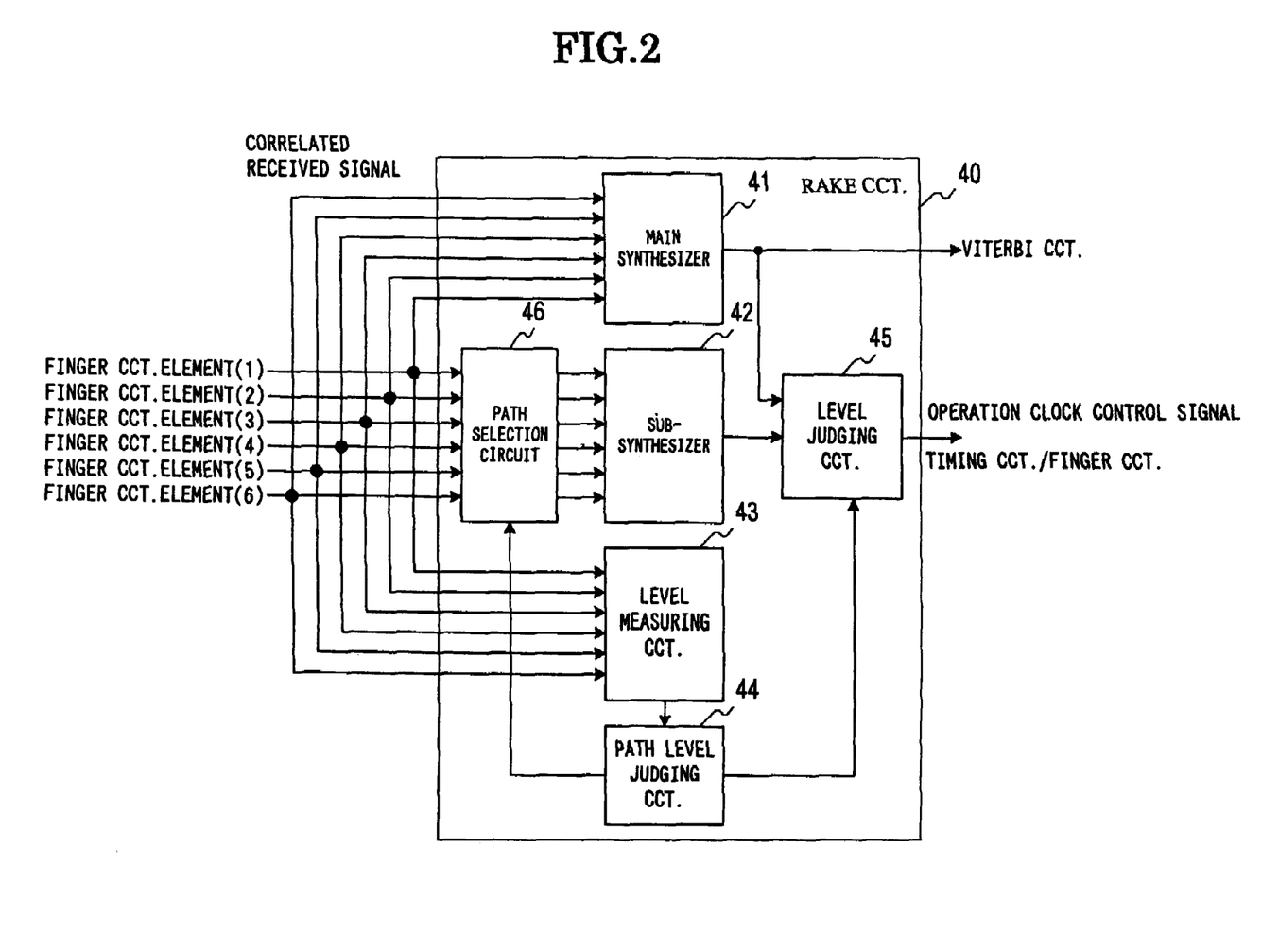
FIG. 2 is a block diagram showing details of the rake circuit 40 shown in FIG. 1.
Figure 3:
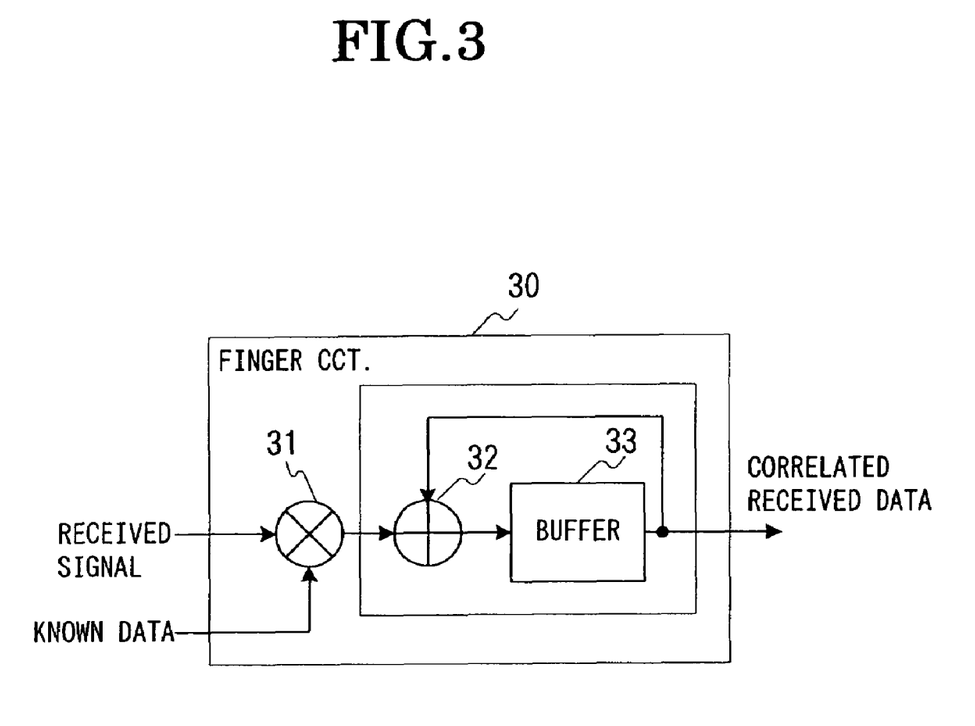
FIG. 3 is a schematic illustrating a correlating process in the finger circuit 30 shown in FIG. 1.

As shown in FIG. 2, the rake circuit 40 has a main synthesizer 41, a sub-synthesizer 42, a level measuring circuit 43, a path level judging circuit 44, a level judging circuit 45 and a path selecting circuit 46. As shown in FIG. 3, each finger circuit element in the finger circuit 30 has a multiplifier 31 for multiplifying the received signal and known data by each other, a buffer (or memory) 33 and an adder for adding together the outputs of the multiplifier 31 and the buffer 33.

The finger circuit elements (1) to (6) in the finger circuit 30 are each connected to the rake circuit 40, the radio circuit 20 and the timing circuit 50. Each element receives the received signal from the radio circuit 20 under control of a timing pulse signal from the timing circuit 50 as triggers. Each element then correlates the received signal input with the known data, and informs the result of the correlation to the rake circuit 40. The timing circuit 50 is connected to the finger circuit 30, and feeds out a timing pulse signal to each of the elements (1) to (6) in the finger circuit 30 for every 10 msec. The CPU 52 is connected to the rake circuit 40, and feeds out threshold data read out from the memory (i.e., E$^2$PROM) 54 to the rake circuit 40.

The Viterbi circuit 60 executes error correction of the synthesized received signal from the rake circuit 40. The codec circuit 70 convert the corrected received signal from the Viterbi circuit 60 to a voice signal, which is fed out to the loudspeaker 80 for outputting voice. The crystal oscillator 90 supplies an operation control clock to each component of the circuit. The memory (or E$^2$PROM) 54 is a programmable read-only memory for preserving (or storing) threshold data set in the rake circuit 40 and capable of electrically erasing the stored data.

The rake circuit 40 shown in FIG. 2 will now be described. The main synthesizer 41 combines the results of correlation fed out from the finger circuit 30. The level measuring circuit 43 computes electric field levels from the correlation results from the finger circuit 30. When an electric field level computed in the level measuring circuit 43 exceeds a threshold level, the path level judging circuit 44 instructs the path selecting circuit 46 not to feed out the received signal from the pertinent finger circuit element to the sub-synthesizer 42. The path selecting circuit 46 feeds out the received signal from each of the elements (1) to (6) in the finger circuit 30 to the sub-synthesizer 42 according to a control signal designated by the path level judging circuit 46.

The sub-synthesizer 42 executes synthesis of each path fed out from the path selecting circuit 46, and feeds out the result to the level judging circuit 45. The level judging circuit 45 compares the outputs from the main synthesizer 41 and the sub-synthesizer 42. Thus, when a difference in excess of a certain fixed value is present, the circuit 45 generates a control signal for discontinuing the operation control clock supply to the finger circuit 30.

Usually, when receiving signals from a plurality of signal propagation paths, the finger circuit 30 is operated according to the number of signal propagation paths and the received signal level in each signal propagation path. At this time, the finger circuit 30 makes a correlation between each signal fed out from the radio circuit 20 and the known signal, and feeds out the correlated value of the received signal to the rake circuit 40. The rake circuit 40 combines the correlated values of the received signal fed out from the elements (1) to (6) of the finger circuit 30 to obtain a synthesized signal, which is fed out to the Viterbi circuit 60 for error correction and then fed out to the codec circuit 70 for conversion to voice signal for the voice output from the loudspeaker 80. The rake circuit 40 measures the levels of the correlated received signals from the elements (1) to (6) in the finger circuit 30, and feeds out a control signal to other circuits according to the results of measurements.

In the receiving terminal for CDMA system according to the present invention, the rake circuit 40 includes the level judging circuit 45. The level judging circuit 45 compares the levels of the correlated received signal fed out from each of the elements (1) to (6) of the finger circuit 30 and a threshold value. When the correlated received signal level is higher than the threshold value, the circuit 45 generates a control signal for suspending the clock supply to the pertinent element in the finger circuit 30 for a predetermined period of time. After the lapse of the predetermined period of time, the element in the finger circuit 30 which has suspended the clock supply, is restored to provide the level judging function again.

Figure 4:
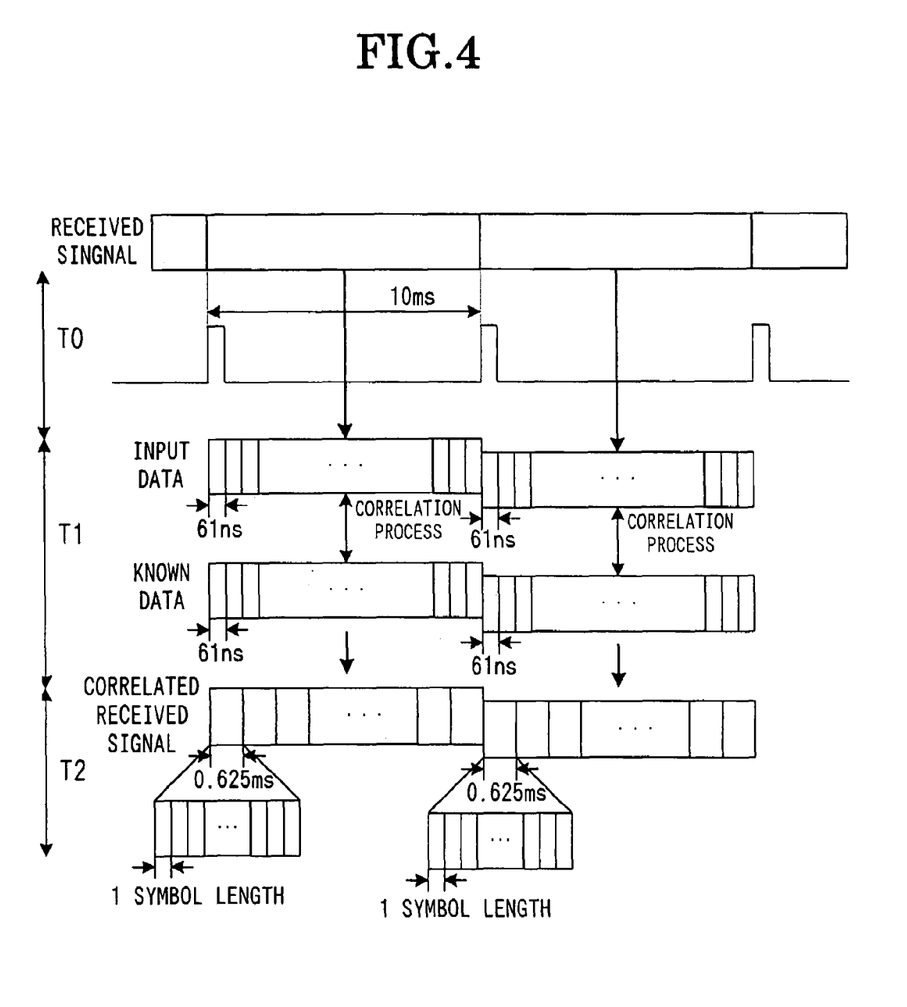
FIG. 4 illustrates the operation of the finger circuit 30.
Figure 5A:
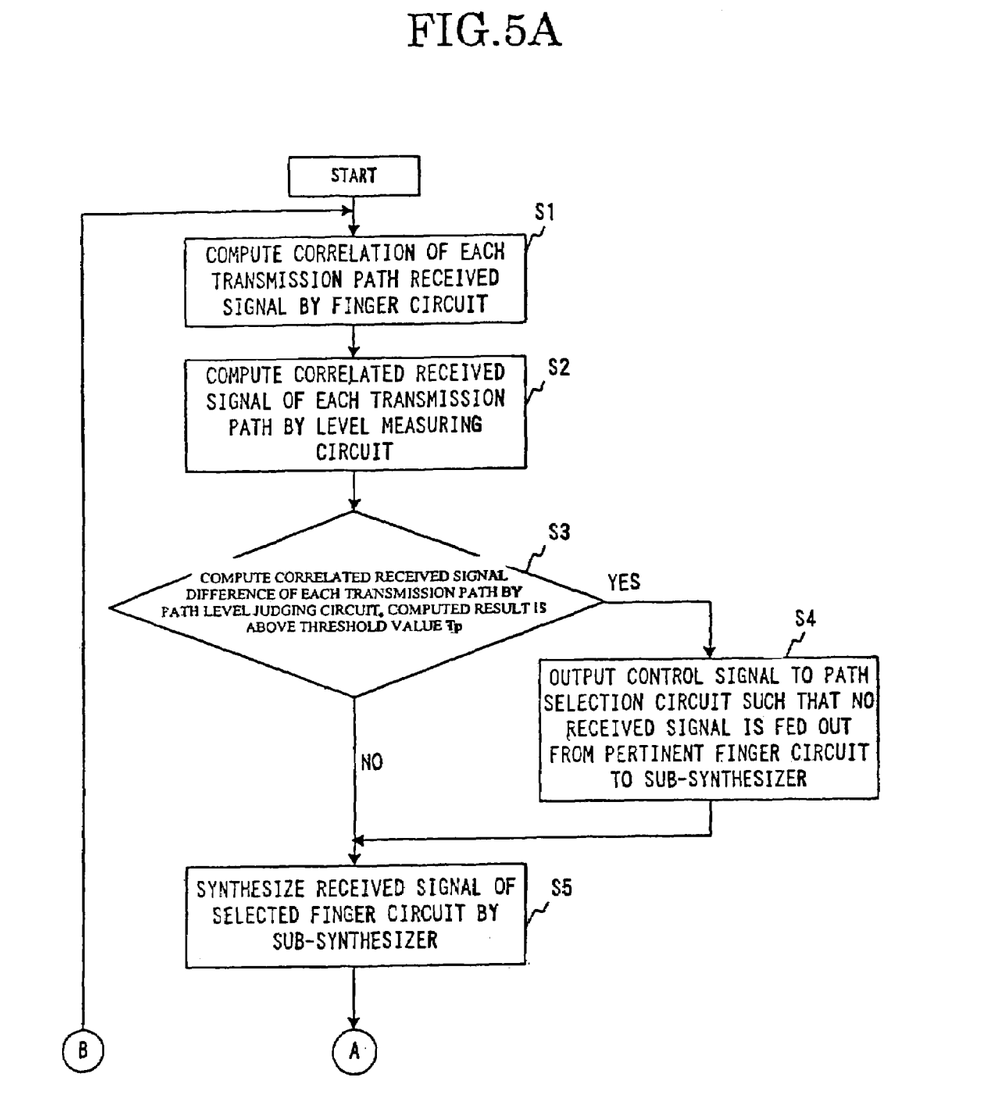
FIGS. 5A and 5B are flow charts showing the operation of CDMA receiving terminal according to the present invention.

The finger circuit 30 makes a correlation between each output signal from the radio circuit 20 and the known signal, and feeds out the correlated value of the received signal (step S1 in FIG. 5). FIG. 4 illustrates the operation of the finger circuit 30. The finger circuit 30 receives each received signal under control of pulse signal fed out from the timing circuit 50 for every 10 msec. (T0 in FIG. 4). At this time, the circuit 30 makes a correlation between the known data and the received data (T1 in FIG. 4), then demodulates the resultant correlated data to symbol unit data, and feeds out this data to the rake circuit 40 (T2 in FIG. 4). Further, as schematically shown in FIG. 3, the mulitiplier 31 in the finger circuit 30 multiplies the known data and received data by each other in units of 61 nsec. The symbol adder 32 addes together the product data from the circuit 30 and data of the buffer 33. This process of addition is executed in one symbol unit to compute the power levels of I and Q signals.

Figure 6:
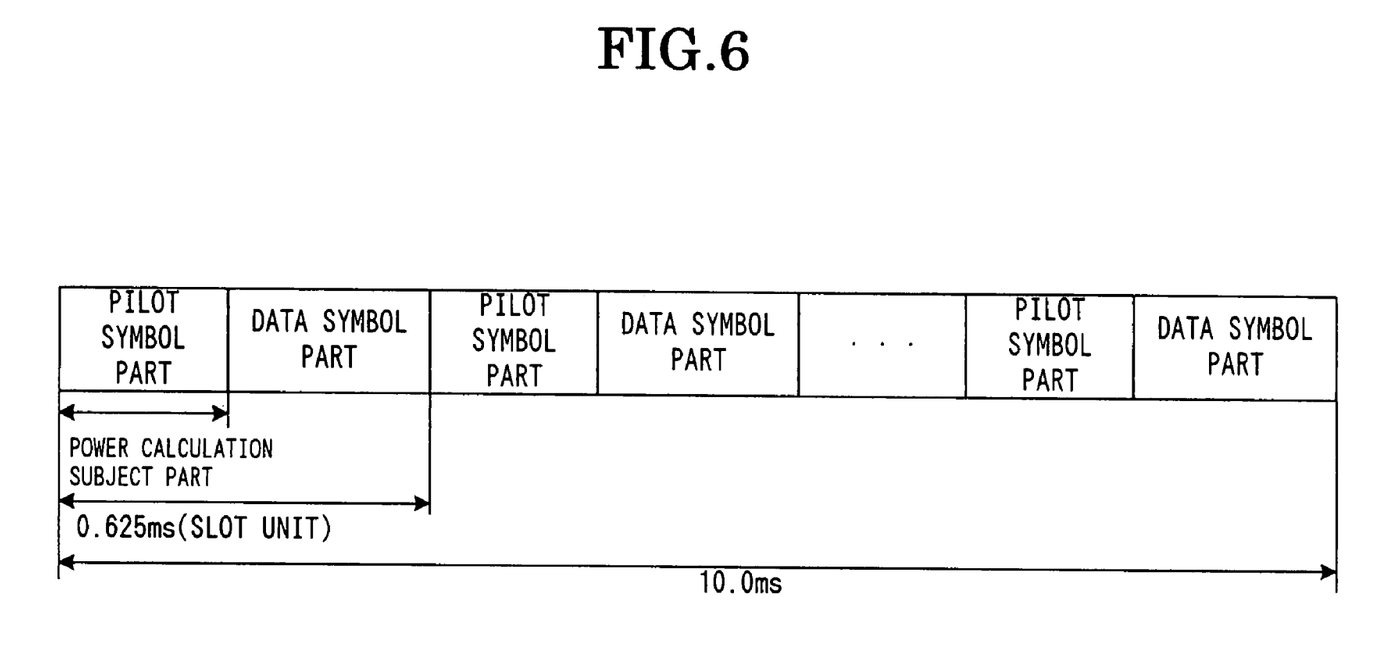
FIG. 6 shows the configuration of pilot symbol part and data part in one frame.

The level measuring circuit 43 executes the level measurement by using a normally transmitted data part (pilot symbol). FIG. 6 shows the configuration of pilot symbol part and data part in one frame (10 msec.). The pilot symbol part is a power (level) computing subject. Each pilot symbol part and data symbol part together constitute a slot unit of 0.625 msec. The level measuring circuit 43 computes the power level of the pilot symbol part for each of the elements (1) and (6) of the finger circuit 30 for every slot. The circuit 43 adds together the result of computation for one frame, and feeds out the sum result to the path level judging circuit 44 (step S2 in FIG. 5).

Figure 7:
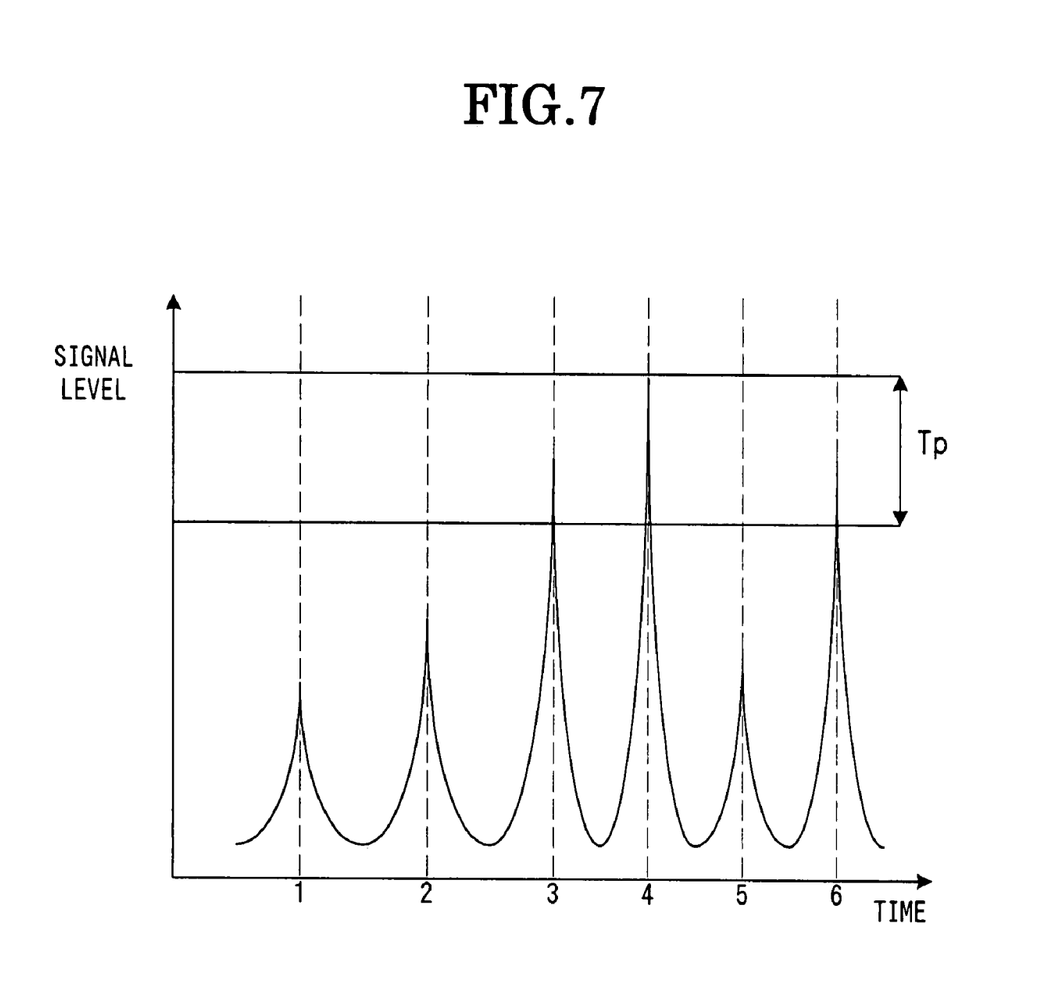
FIG. 7 shows the pass selection example of CDMA receiving terminal in FIG. 1.

The path level judging circuit 44 obtains the difference between the maximum level and each of the other levels as the electric field levels in the elements (1) to (6) of the finger circuit 30, and compares the difference with threshold value Tp (step S3 in FIG. 5). FIG. 7 shows the way of comparison. When the difference is above the threshold, the path level judging circuit 44 controls the path selecting circuit 46 such that no received signal is fed out from the pertinent finger circuit to the sub-synthesizer 42 (step S4 in FIG. 5). In other words, the sub-synthesizer 42 combines only path higher by a constant value than the other levels, and feeds out the resultant synthesized data to the level judging circuit 45 (step S5 in FIG. 5A).

FIG. 7 shows an example of the results of path level measurement in the path level measuring circuit 43 while the operation control clock is supplied to each element (1) to (6) of the finger circuit 30. In the Figure, the ordinate is taken for signal level, the abscissa is taken for time. In the example as shown, only paths 3 and 6 are within the threshold value Tp with respect to the maximum level path 4. Thus, in this case, these paths 3, 4 and 6 are subjects of synthesis in the sub-synthesizer 42.

Figure 5B:
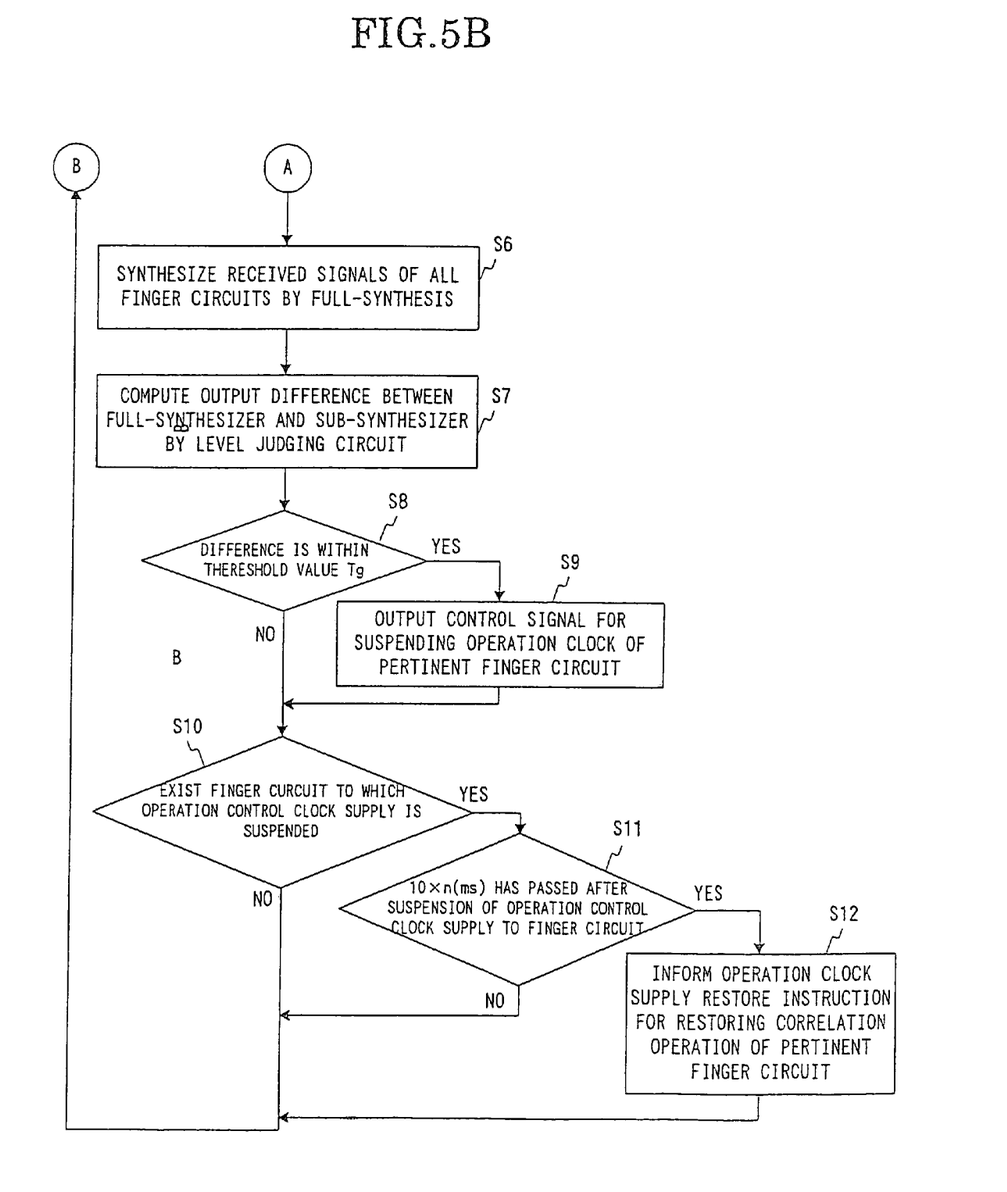

The main synthesizer 41 combines the levels of all the received signals in the elements (1) to (6) of the finger circuit 30. The level judging circuit 45 computes the difference between the result outputs of the main synthesizer 41 and sub-synthesizer 42 (step S7 in FIG. 5). The level judging circuit 45 judges whether the computed difference is within the threshold value Tg (step S8 in FIG. 5). If this difference is within the threshold value Tg (Yes), the path level judging circuit 45 decides that suspending the operation control clock supply to the finger circuit corresponding to the path selected by the path level judging circuit 44 has no adverse effects on the reception quality, and generates a control signal for suspending the operation control clock supply to the pertinent element of the finger circuits (step S9 in FIG. 5).

The level judging circuit 45 also retrieves for an element, if any, of the finger circuit 30, to which the operation control clock supply is suspended (step S10 in FIG. 5). If any element without operation control clock supply thereto is present, the circuit 45 checks whether a predetermined period of time (10×n ms) has passed after the suspension of the operation control clock supply to that element (step S11 in FIG. 5). When the predetermined period of time has passed since the suspension (Yes), the circuit 45 resumes or restores the operation control clock supply to the pertinent element of the finger circuit (step S12 in FIG. 5). When "No" yields in the steps S10 and S11 and also after the step S12, the routine returns to the step S1.

Then, the main synthesizer 41 combines the correlated received signals from the elements (1) to (6) in the finger circuit 30, and feeds out the synthesized signal to the Viterbi circuit 60. The Viterbi circuit 60 executes error correction of the synthesized received signal, and feeds out the corrected received signal to the codec circuit 79. The codec circuit 70 converts the received signal to voice signal for voice output from the loudspeaker 80.

In the embodiment shown in FIG. 1, the elements (1) and (6) in the finger circuit 30 operates under control of a timing control signal from the timing circuit 50 as triggers. Thus, when the result of correlation informed from the elements (1) to (6) of the finger circuit 30 is above the threshold (see FIG. 7), it is possible to suspend the operation control clock supply to the pertinent element of the circuit 30 for a predetermined period of time.

As has been understood from the foregoing description, with the receiving terminal for CDMA system according to the present invention it is possible to obtain the following pronounced effects in practice.

First, it is possible reduce power consumption compared to the prior art receiving terminal for CDMA system. This is so because in the case when the correlated value of the received signal fed out from each element of the finger circuit is above the threshold the operation control clock supply to that element is suspended.

Secondly, the receiving terminal for CDMA system is obtainable by merely adding the level judging circuit for suspending the operation control clock supply to the rake circuit used in the prior art receiving terminal for CDMA system. The construction is thus simple and is inexpensively realizable.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A receiving terminal for a CDMA system, comprising:
   a plurality of finger circuit elements, each of said plurality of finger circuit elements for making a correlation between a received signal from a radio circuit connected to an antenna and a known signal and for outputting a correlated received signal as a result of the correlation; and
   a rake circuit for combining the correlated received signals output from the plurality of finger circuit elements to provide a synthesized received signal;
   wherein the rake circuit is configured to execute electric field level judgment based on the correlated received signals output from the plurality of finger circuit elements and a predetermined threshold level;
   wherein the rake circuit is configured to obtain a difference between (i) a particular electric field level of a particular correlated received signal output from a particular finger circuit element of the plurality of finger circuit elements and (ii) a certain electric field level of a certain correlated received signal output from a certain finger circuit element of the plurality of finger circuit elements, and is configured to compare the difference with the predetermined threshold level as part of the electric field level judgment; and wherein an operation of at least one finger circuit element of the plurality of finger circuit elements can be suspended for a fixed, predetermined time period according to a result of the electric field level judgment.

2. The receiving terminal according to claim 1, wherein an operation of a control clock supply to the at least one finger circuit element is suspended for power consumption reduction according to the result of the electric field level judgment by the rake circuit.

3. The receiving terminal according to claim 1, wherein an operation of a control clock supply to a timing circuit in the at least one finger circuit element is suspended according to the result of the electric field level judgment by the rake circuit.

4. The receiving terminal according to claim 2, wherein the operation of the control clock supply to the at least one finger circuit element is resumed after a lapse of the predetermined time period.

5. The receiving terminal according to claim 1, wherein the predetermined threshold level is preset in a memory.

6. The receiving terminal according to claim 5, wherein the memory is an $E^2$PROM, and the predetermined threshold level therefrom is supplied under CPU control to the rake circuit.

7. The receiving terminal according to claim 1, wherein each of the plurality of finger circuit elements makes the correlation between the received signal from the radio circuit and said known signal, demodulates correlated data to symbol unit data, and feeds out demodulated correlated data to the rake circuit.

8. The receiving terminal according to claim 1, wherein the rake circuit includes a level measuring circuit for executing level measurement for each correlated received signal output from each corresponding finger circuit element of the plurality of finger circuit elements by computing a power level in a pilot symbol part of each slot in one frame of each correlated received signal and adding together the results of the computation for the slots in the frame of each correlated received signal.

9. The receiving terminal according to claim 1, wherein the rake circuit is configured to obtain differences between (1) a maximum level of electric field levels from among the correlated received signals output from the plurality of finger circuit elements and (2) an electric field level of each of said correlated received signals output from the plurality of finger circuit elements, and is configured to compare the differences with the predetermined threshold level.

10. The receiving terminal according to claim 1,
wherein the receiving terminal is configured to suspend an operation of only one finger circuit element of the plurality of finger circuit elements for the fixed, predetermined time period according to the result of the electric field level judgment.

11. A receiving terminal for a CDMA system for receiving a plurality of received signals from a plurality of signal propagation channels, the receiving terminal comprising:
a circuit for judging an electric field level of each of the plurality of received signals;
wherein the circuit is configured to obtain a difference between (i) a particular electric field level of a particular received signal of the plurality of received signals and (ii) a certain electric field level of a certain received signal of the plurality of received signals, and is configured to compare the difference with a predetermined threshold level to determine a comparison result; and
wherein the circuit is configured to selectively suspend operation of a control clock supply to a circuit system, which is making a correlation between the certain received signal and a known signal, for a predetermined period of time based on the comparison result.

12. A receiver, comprising:
a plurality of finger circuit elements, each of said plurality of finger circuit elements for making a correlation between a received signal from a radio circuit connected to an antenna and a known signal and for outputting a correlated received signal as a result of the correlation; and
a rake circuit for combining the correlated received signals output from the plurality of finger circuit elements to provide a synthesized received signal;
wherein the rake circuit is configured to execute electric field level judgment based on the correlated received signals output from the plurality of finger circuit elements and a predetermined threshold level;
wherein the rake circuit is configured to obtain a difference between (i) a particular electric field level of a particular correlated received signal output from a particular finger circuit element of the plurality of finger circuit elements and (ii) a certain electric field level of a certain correlated received signal output from a certain finger circuit element of the plurality of finger circuit elements, and is configured to compare the difference with the predetermined threshold level as part of the electric field level judgment; and
wherein an operation of at least one finger circuit element of the plurality of finger circuit elements can be suspended for a fixed, predetermined time period according to a result of the electric field level judgment.

13. The receiver according to claim 12, wherein an operation of a control clock supply to the at least one finger circuit element is suspended for power consumption reduction according to the result of the electric field level judgment by the rake circuit.

14. The receiver according to claim 12, wherein an operation of a control clock supply to a timing circuit in the at least one finger circuit element is suspended according to the result of the electric field level judgment by the rake circuit.

15. The receiver according to claim 13, wherein the operation of the control clock supply to the at least one finger circuit element is resumed after a lapse of the predetermined time period.

16. The receiver according to claim 12, wherein the predetermined threshold level is preset in a memory.

17. The receiver according to claim 16, wherein the memory is an $E^2$PROM, and the predetermined threshold level therefrom is supplied under CPU control to the rake circuit.

18. The receiver according to claim 12, wherein each of the plurality of finger circuit elements makes the correlation between the received signal from the radio circuit and said known signal, demodulates correlated data to symbol unit data, and feeds out demodulated correlated data to the rake circuit.

19. The receiver according to claim 12, wherein the rake circuit includes a level measuring circuit for executing level measurement for each correlated received signal output from each corresponding finger circuit element of the plurality of finger circuit elements by computing a power level in a pilot symbol part of each slot in one frame of each correlated received signal and adding together the results of the computation for the slots in the frame of each correlated received signal.

20. The receiver according to claim 12, wherein the rake circuit is configured to obtain differences between (1) a maximum level of electric field levels from among the correlated received signals output from the plurality of finger circuit elements and (2) an electric field level of each of said correlated received signals output from the plurality of finger circuit elements, and is configured to compare the differences with the predetermined threshold level.

21. A receiver for receiving a plurality of received signals from a plurality of signal propagation channels, the receiver comprising:
   a circuit for judging an electric field level of each of the plurality of received signals;
   wherein the circuit is configured to obtain a difference between (i) a particular electric field level of a particular received signal of the plurality of received signals and (ii) a certain electric field level of a certain received signal of the plurality of received signals, and is configured to compare the difference with a predetermined threshold level to determine a comparison result; and
   wherein the circuit is configured to selectively suspend an operation of a control clock supply to a circuit system, which is making a correlation between the certain received signal and a known signal, for a predetermined period of time based on the comparison result.

22. A receiving method for a CDMA system, comprising:
   making a correlation between each of a plurality of received signals and a known signal to provide a plurality of correlated received signals;
   combining two or more of the plurality of correlated received signals; and
   executing electric field level judgment according to the plurality of correlated received signals and a predetermined threshold level, and suspending an operation of a circuit that performs correlation for a fixed, predetermined time period according to a result of the level judgment;
   wherein the step of executing electric field level judgment, includes:
      obtaining a difference between (i) a particular electric field level of a particular correlated received signal of the plurality of correlated received signals and (ii) a certain electric field level of a certain correlated received signal of the plurality of correlated received signals; and
      comparing the difference with the predetermined threshold level.

23. A receiving method, comprising:
   receiving a plurality of received signals from a plurality of signal propagation channels;
   judging an electric field level of each of the plurality of received signals;
   obtaining a difference between (i) a particular electric field level of a particular received signal of the plurality of received signals and (ii) a certain electric field level of a certain received signal of the plurality of received signals;
   comparing the difference with a predetermined threshold level to determine a comparison result; and
   selectively suspending operation of a control clock supply to a circuit, which is making a correlation between the certain received signal and a known signal, for a predetermined period of time based on the comparison result.

24. A receiving terminal for a CDMA system, comprising:
   a finger circuit having a plurality of finger circuit elements, each of said plurality of finger circuit elements for making a correlation between a received signal from a radio circuit connected to an antenna and a known signal and for outputting a correlated received signal as a result of the correlation; and
   a rake circuit for combining the correlated received signals output from the plurality of finger circuit elements;
   wherein the rake circuit includes a level judgment circuit for executing electric field level judgment based on the correlated received signals output from the plurality of finger circuit elements and a predetermined threshold level;
   wherein an operation of at least one finger circuit element can be suspended for a fixed, predetermined time period according to the result of the electric field level judgment;
   wherein the rake circuit further includes:
      a main synthesizer for combining electric field levels of all of the correlated received signals output from the plurality of finger circuit elements; and
      a sub-synthesizer for combining electric field levels of a subset of the correlated received signals output from the plurality of finger circuit elements; and
   wherein the level judgment circuit is configured to execute the electric field level judgment by comparing the predetermined threshold value with a difference between an output of the main synthesizer and an output of the sub-synthesizer.

25. The receiving terminal according to claim 24,
   wherein the subset of the correlated received signals output from the plurality of finger circuit elements includes at least a correlated received signal output from a finger circuit element that has a maximum electric field level among the correlated received signals output from the plurality of finger circuit elements.

26. The receiving terminal according to claim 24,
   wherein the rake circuit further includes:
      a path level judging circuit for determining a particular correlated received signal that has a maximum electric field level from among the correlated received signals output from the plurality of finger circuit elements, and for comparing a second threshold value with differences between (1) the electric field level of the particular correlated received signal and (2) an electric field level of each of the correlated received signals output from the plurality of finger circuit elements; and
   wherein the rake circuit is configured to determine the subset of the correlated received signals output from the plurality of finger circuit elements that are combined by the sub-synthesizer based on results of the comparisons by the path level judging circuit.

* * * * *